(12) United States Patent
Kojima (10) Patent No.: US 11,305,389 B2
(45) Date of Patent: Apr. 19, 2022

(54) ELECTRIC CLAMPING DEVICE

(71) Applicant: KOSMEK LTD., Kobe (JP)

(72) Inventor: Ryota Kojima, Kobe (JP)

(73) Assignee: KOSMEK LTD, Kobe (JP)

( * ) Notice: Subject to any disclaimer, the term of this patent is extended or adjusted under 35 U.S.C. 154(b) by 209 days.

(21) Appl. No.: 16/757,017

(22) PCT Filed: Oct. 15, 2018

(86) PCT No.: PCT/JP2018/038308
§ 371 (c)(1),
(2) Date: Apr. 17, 2020

(87) PCT Pub. No.: WO2019/087756
PCT Pub. Date: May 9, 2019

(65) Prior Publication Data
US 2020/0338675 A1    Oct. 29, 2020

(30) Foreign Application Priority Data

Oct. 31, 2017    (JP) .............................. JP2017-210078

(51) Int. Cl.
*B23Q 3/06* (2006.01)
*B25B 5/16* (2006.01)

(52) U.S. Cl.
CPC .................. *B23Q 3/06* (2013.01); *B25B 5/16* (2013.01); *B23Q 2703/02* (2013.01); *B23Q 2703/12* (2013.01)

(58) Field of Classification Search
CPC .......... B23Q 3/06; B23Q 3/062; B23Q 3/069; B23Q 2703/12; B25B 5/16; B25B 5/062; B25B 5/10; B25B 5/06; B25B 5/061; B25B 5/04; B24B 1/106; B24B 1/14; B24B 1/18
See application file for complete search history.

(56) References Cited

U.S. PATENT DOCUMENTS

| 4,700,936 A | * | 10/1987 | Lunn ........................ B25B 1/18 269/226 |
| 9,550,262 B2 | * | 1/2017 | Fukano ................... B25B 5/108 |

FOREIGN PATENT DOCUMENTS

| CN | 205630300 U | 10/2016 |
| DE | 3408188 C | * 4/1985 |
| JP | 2014-223714 A | 12/2014 |

(Continued)

OTHER PUBLICATIONS

English Translation of JP 2014223714 (Year: 2014).*
(Continued)

*Primary Examiner* — Monica S Carter
*Assistant Examiner* — Leanna R Lincoln
(74) *Attorney, Agent, or Firm* — Bacon & Thomas, PLLC (57) ABSTRACT

An output rod (20) of an electric clamping device includes: a tubular power transmission member (25) screw-connected to a decelerator (6); and an output rod main body (24) disposed radially inward of an inner peripheral surface of a cylindrical hole of the power transmission member (25) with a clearance between the output rod main body (24) and the inner peripheral surface. The output rod (20) further includes: a rotation preventing mechanism (26); a lock-side driving mechanism (27, 42), a release-side driving mechanism (28), and an output rod guide mechanism (29).

8 Claims, 6 Drawing Sheets

(56) References Cited

FOREIGN PATENT DOCUMENTS

JP 2014223714 A * 12/2014

OTHER PUBLICATIONS

English Translation of DE 3408188 (Year: 1985).*
STIC Search Report (Year: 2021).*
Office Action dated Apr. 15, 20211, issued in corresponding Chinese Application No. 2018 80068688.3.
Search Report dated Jan. 15, 2019, issued in corresponding International Application No. PCT/JP2018/038308.

* cited by examiner

ELECTRIC CLAMPING DEVICE

TECHNICAL FIELD

The present invention relates to an electric clamping device.

BACKGROUND ART

Known examples of such an electric clamping device include a device described in Patent Literature 1 specified below. The known device is structured as follows.

A decelerator is disposed below an output rod. A conversion mechanism configured to convert rotational motion of a motor connected to the decelerator to linear motion and to transmit the linear motion to the output rod is provided between the output rod and the decelerator. This arrangement forms a basic structure of an electric clamping device in which upward/downward movement of its output rod is driven by a motor.

CITATION LIST

Patent Literature

Patent Literature 1: Japanese Unexamined Patent Publication No. 2014-223714

SUMMARY OF INVENTION

Technical Problem

In recent years, it is required to make such an electric clamping device as described in the above known technique more compact. One possible way to make the device more compact is to provide the decelerator beside the output rod to reduce the height of the entire device. This enables downsizing of the electric clamping device.

However, providing the decelerator beside the output rod may cause the following problem.

When a workpiece is locked by moving the output rod from a release side to a lock side, a reaction force from the workpiece acts on the output rod. The reaction force slightly inclines the output rod. Due to this, if the locking-releasing operation is repeated multiple times by moving the output rod up and down, the quality of mesh between the output rod and the decelerator may be deteriorated, leading to a decrease in efficiency of transmission from the decelerator to the output rod.

An object of the present invention is to mitigate the problem: a decrease in efficiency of transmission between an output rod and a decelerator in an electric clamping device in which the decelerator is disposed beside the output rod.

Solution to Problem

In order to achieve the above object, in the present invention, an electric clamping device is structured as follows, as shown in FIG. 1 to FIG. 6, for example.

The electric clamping device in an aspect of the present invention includes: an output rod 20 inserted in a housing 1 so as to be movable in an axial direction toward a lock side and a release side; a motor 5 attached to the housing 1; and a decelerator 6 provided beside the output rod 20, the decelerator 6 configured to transmit rotational motion of the motor 5 to the output rod 20. The output rod 20 includes: a tubular power transmission member 25 screw-connected to the decelerator 6; an output rod main body 24 disposed radially inward of an inner peripheral surface of a cylindrical hole of the power transmission member 25 with a clearance between the output rod main body 24 and the inner peripheral surface; a rotation preventing mechanism 26 configured to prevent relative rotation between the output rod main body 24 and the power transmission member 25; a lock-side driving mechanism 27, 42 configured to move the output rod main body 24 toward the lock side via the power transmission member 25; a release-side driving mechanism 28 configured to move the output rod main body 24 toward the release side via the power transmission member 25; and an output rod guide mechanism 29 configured to guide movement of the output rod main body 24 while preventing co-rotation with the decelerator 6.

The electric clamping device of the above aspect of the present invention provides the following functions and effects.

When an object to be clamped is locked by moving the output rod to the lock side, a reaction force from the object acts on the output rod main body to incline the output rod main body. However, the power transmission member structuring the output rod is provided as a separate member not unitary with the output rod main body, and the power transmission member is disposed radially outward from the output rod main body with the clearance between them. Therefore, the power transmission member is less likely to be affected by the reaction force from the object, unlike the output rod main body. Thus, it is possible to prevent deterioration in quality of mesh between the power transmission member and the decelerator. That is, it is possible to prevent the decrease in efficiency of transmission between the output rod and the decelerator.

It is preferable that the electric clamping device of the above aspect of the present invention further includes the following features.

It is preferable that the lock-side driving mechanism 27, 42 includes: a transmission surface 31a, 43a provided at a release-side portion of a flange portion 31 provided on an outer periphery of the output rod main body 24, the transmission surface 31a, 43a sloping toward the lock side relative to the axial direction; and a push surface 32a provided on a lock-side inner surface of the power transmission member 25, and that when the motor 5 moves the power transmission member 25 to the lock side via the decelerator 6, the push surface 32a pushes the transmission surface 31a, 43a thereby to move the output rod main body 24 toward the lock side.

The above arrangement makes it possible to stabilize the motion of the output rod main body inclined by the reaction force, i.e., swaying motion of the output rod main body. This further mitigates the effect of the reaction force to the power transmission member structuring the output rod.

It is further preferable that the electric clamping device of the above aspect of the present invention is arranged such that the transmission surface 31a, 43a is shaped as a spherical surface. This arrangement further stabilizes the swaying motion of the output rod main body.

It is further preferable that the electric clamping device of the above aspect of the present invention is arranged such that the spherical push surface 32a is shaped as a spherical surface configured to make surface contact with the transmission surface 31a, 43a. This arrangement further stabilizes the swaying motion of the output rod main body.

It is further preferable that the electric clamping device of the above aspect of the present invention is arranged such that the transmission surface 43a is structured by a plurality of transmission balls 43 fitted in a recessed portion 31b provided on a release-side surface of the flange portion 31. This arrangement further stabilizes the swaying motion of the output rod main body.

It is further preferable that the electric clamping device of the above aspect of the present invention is arranged such that guide cylinders 40, 41 configured to guide movement of the output rod main body 24 in the axial direction are respectively attached to a release-side end portion and a lock-side end portion of the housing 1.

This arrangement makes the amount of sway of the output rod main body smaller.

It is further preferable that the electric clamping device of the above aspect of the present invention is arranged such that: an annular wall 34 protrudes from a lock-side inner surface of the housing 1 toward the release side; the output rod main body 24 is inserted in the annular wall 34; the output rod guide mechanism 29 includes a plurality of guide grooves 35 provided on an outer periphery of the output rod main body 24 at predetermined intervals in its circumferential direction and engagement balls 38 supported by the annular wall 34, the engagement balls 38 respectively fitted in the guide grooves 35; and each of the guide grooves 35 includes a rotation groove 36 and a linear groove 37 which are provided continuously from the lock side toward the release side.

This arrangement realizes the type of electric clamping device in which an output rod (output rod main body) rotates.

Furthermore, it is preferable that the decelerator 6 is a worm decelerator.

Advantageous Effects of Invention

According to the embodiment of the present invention, it is possible to mitigate the problem that is a decrease in efficiency of transmission between an output rod and a decelerator.

DESCRIPTION OF EMBODIMENTS

The following describes an embodiment of the present invention with reference to FIG. 1 to FIG. 5.

First of all, an overall structure of an electric clamping device of this embodiment will be described. A housing 1 includes a lower housing 2 and an upper housing 3. A motor 5 is attached to a side surface of the upper housing 3 via a joint member 4. A decelerator 6 is attached in the upper housing 3. The lower housing 2 is fixed to a table T functioning as a stationary stand by a plurality of bolts (not shown). The motor 5 in this embodiment is a stepping motor.

Figure 1:
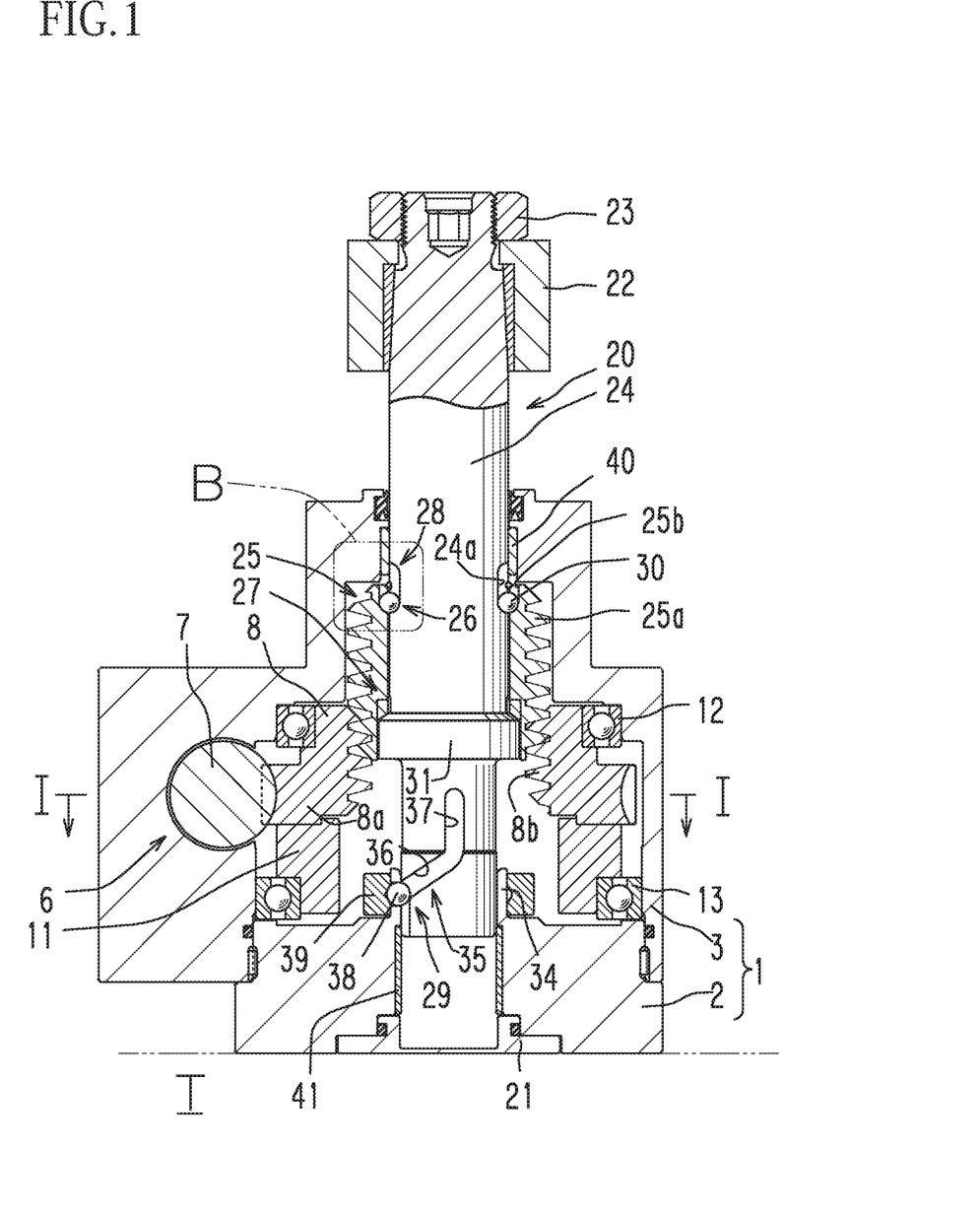
FIG. 1 shows an embodiment of the present invention, and is a partial elevational view in section of an electric clamping device in a release state.
Figure 3:
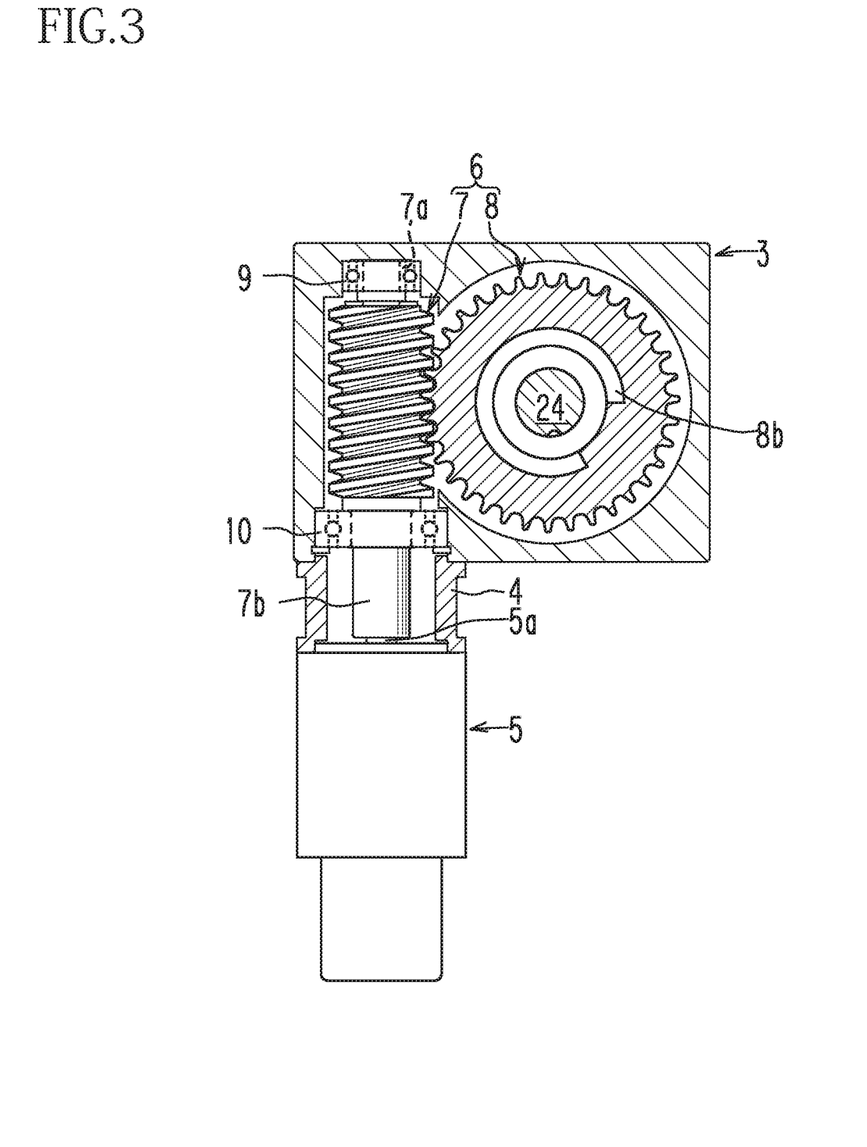
FIG. 3 is a partial cross section taken along a line I to I in FIG. 1.

As shown in FIG. 3, the decelerator 6 in this embodiment is a worm decelerator. The worm decelerator includes: a cylindrical worm 7 connected to an output shaft 5a of the motor 5; and a worm wheel 8 meshing with the worm 7. As shown in FIG. 3, shafts 7a and 7b provided at both axial end portions of the worm 7 are respectively supported by bearings 9 and 10 in a rotatable manner, and this allows the worm 7 to be rotatable. Furthermore, as shown in FIG. 1, a tubular joint member 11 is fixed, for example, by press-fitting, to an axial end portion 8a of the worm wheel 8. The worm wheel 8 to which the joint member 11 is fixed is supported by bearings 12 and 13 in a rotatable manner.

An output rod 20 is inserted in the housing 1 (the upper housing 3 and the lower housing 2) so as to be movable in an up-down direction (axial direction) toward a release side (upper side) and toward a lock side (lower side). A cap 21 is attached to a lower end portion of the lower housing 2, and thereby the housing 1 is sealed.

The output rod 20 includes: an output rod main body 24; and a tubular power transmission member 25 in which the output rod main body 24 is inserted. A clamp arm 22 is fixed to an upper end portion of the output rod main body 24 by a nut 23. The output rod main body 24 is disposed radially inward of an inner peripheral surface of a cylindrical hole of the power transmission member 25 with a clearance between them. The clearance is very small.

A guide cylinder 40 configured to guide movement of the output rod main body 24 in the axial direction is attached to an upper portion (release-side end portion) of the upper housing 3. A guide cylinder 41 configured to guide movement of the output rod main body 24 in the axial direction is attached a lower housing 2 (a lower portion (lock-side end portion) of the housing 1).

An external thread portion 25a (male feed screw portion) is provided on an outer peripheral surface of the power transmission member 25. An internal thread portion 8b (female feed screw portion) meshing with the external thread portion 25a is provided on an inner peripheral surface of the worm wheel 8. At the feed screw portions 25a and 8b, the worm wheel 8 is screw-connected to the power transmission member 25.

Now, the output rod 20 includes: a rotation preventing mechanism 26; a lock-side driving mechanism 27; a release-side driving mechanism 28; and an output rod guide mechanism 29. Each of these mechanisms will be described in order.

Figure 5:
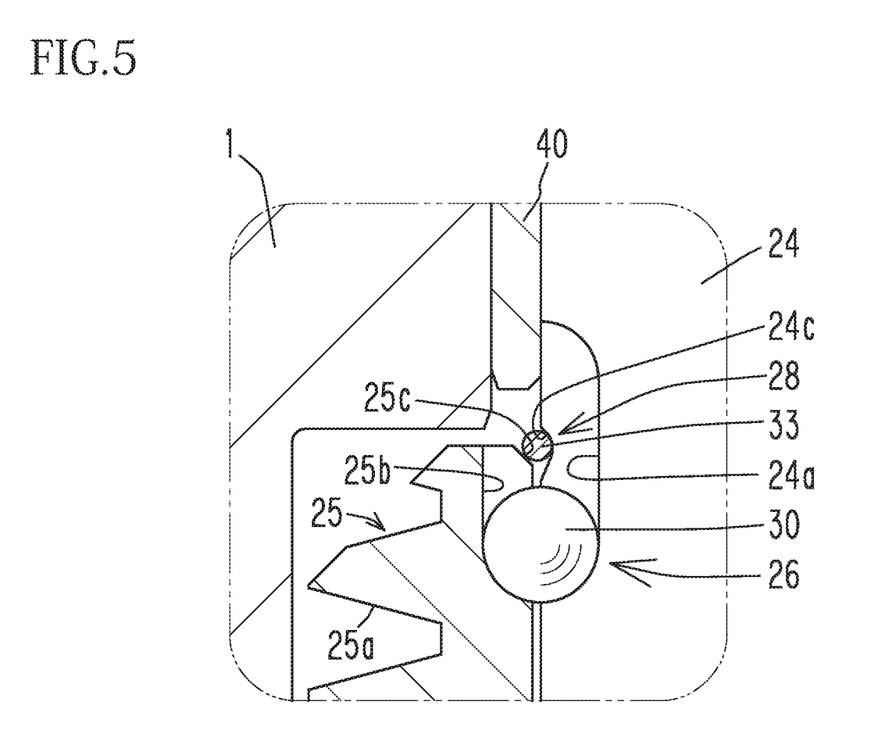
FIG. 5 is an enlarged view of a part B in FIG. 1.

The rotation preventing mechanism 26 is configured to prevent relative rotation between the output rod main body 24 and the power transmission member 25, and is structured as follows. As shown in FIG. 5, at least one recess 24a is provided on an outer peripheral surface of the output rod main body 24 and at least one recess 25b is provided on an inner peripheral surface of the power transmission member 25. In a space created by each recess 24a and the corresponding 25b, a rotation preventing ball 30 is fitted. The number of rotation preventing balls 30 is not limited. For example, four rotation preventing balls 30 may be fitted in respective spaces created by the recesses 24a and 25b at intervals of 90 degrees in a circumferential direction of the output rod main body 24.

Figure 4:
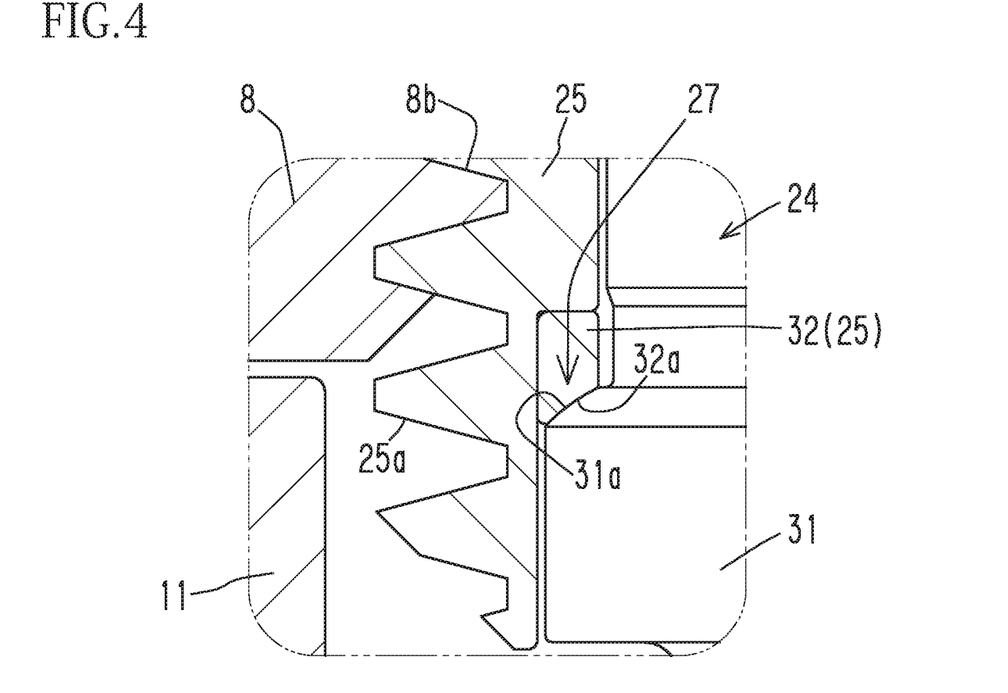
FIG. 4 is an enlarged view of a part A in FIG. 2.

The lock-side driving mechanism 27 is configured to move the output rod main body 24 toward the lock side via the power transmission member 25, and is structured as follows. A flange portion 31 protruding radially outward is provided on an outer periphery of the output rod main body 24. As shown in FIG. 4 with reference numerals, an upper surface (release-side surface) of the flange portion 31 is a transmission surface 31a sloping toward the lock side relative to the axial direction. In this embodiment, the transmission surface 31a is shaped as a spherical surface. A portion of a lower (lock-side) inner surface of the power transmission member 25, which faces the transmission surface 31a in the axial direction, functions as a push surface 32a configured to make surface contact with the transmission surface 31a. In this embodiment, the push surface 32a is shaped as a spherical surface. The power transmission member 25 has a ring member 32, and an under surface of the ring member 32 functions as the push surface 32a. The reason why the ring member 32 is included in the power transmission member 25a as a separate component is to facilitate machine processing to form the push surface 32a. That is, the ring member 32 is a component structuring the power transmission member 25.

The release-side driving mechanism 28 is configured to move the output rod main body 24 toward the release side via the power transmission member 25, and is structured as follows. As shown in FIG. 5 with reference numerals, an inner peripheral surface of a portion defining an upper end (release-side end) portion of the cylindrical hole of the power transmission member 25 is an inclined surface 25c. Meanwhile, an annular groove 24c is provided at a portion of an outer periphery of the output rod main body 24 which is radially opposed to the inclined surface 25c. A retaining ring 33 is fitted in the groove 24c.

The output rod guide mechanism 29 is configured to guide movement of the output rod main body 24 while preventing co-rotation of the output rod 20 with the worm wheel 8 (decelerator). The output rod guide mechanism 29 is structured as follows. The annular wall 34 protrudes upward (toward the release side) from an inner surface of the lower housing 2 (a lock-side inner surface of the housing 1). The output rod main body 24 is inserted in a cylindrical hole of the annular wall 34. A plurality of guide grooves 35 are provided on an outer periphery of the output rod main body 24 at predetermined intervals in its circumferential direction. Each guide groove 35 has a rotation groove 36 and a linear groove 37 which are provided continuously from the lower side (lock side) toward the upper side (release side). An engagement ball 38 is fitted in each guide groove 35, and the engagement balls 38 are supported by the annular wall 34. A sleeve 39 is fitted over the engagement balls 38.

The electric clamping device having the above-described structure operates as follows.

In a release state shown in FIG. 1, the output rod main body 24 has been raised via the power transmission member 25 to an upper limit position by the worm wheel 8 of the decelerator 6 rotated by the motor 5 rotated for releasing.

Figure 2:
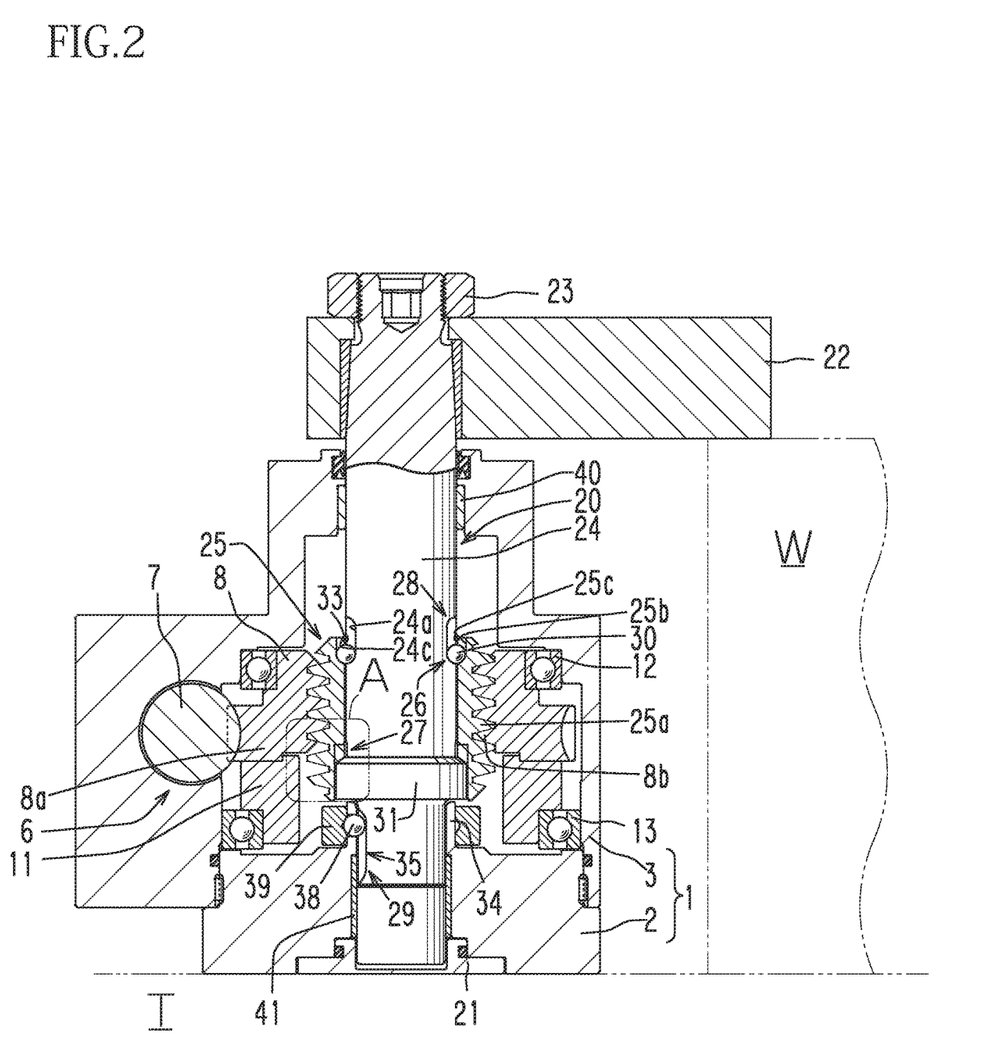
FIG. 2 shows a lock state of the electric clamping device, and is a diagram similar to FIG. 1.

To change the state of the electric clamping device from the release state of FIG. 1 to a lock state of FIG. 2, the motor 5 is rotated for locking oppositely to the above, and then the motor 5 rotates the decelerator 6, so that the rotating worm wheel 8 lowers the output rod main body 24 via the power transmission member 25.

The descent process the output rod main body 24 is described in detail. The rotational motion of the worm wheel 8 is converted to a linear motion at the feed screw portions 8b and 25a and thereby the power transmission member 25 descends. At this time, the push surface 32a of the ring member 32 structuring the power transmission member 25 pushes the transmission surface 31a of the flange portion 31 of the output rod main body 24 and this makes the output rod main body 24 descend.

It should be noted that the descent process of the output rod main body 24 is achievable on the premise that: the relative rotation between the output rod main body 24 and the power transmission member 25 is prevented by the rotation preventing mechanism 26; and the co-rotation of the output rod 20 (the output rod main body 24 and the power transmission member 25) with the worm wheel 8 is prevented by the output rod guide mechanism 29. The same can apply to an ascent process of the output rod main body 24, which will be described later.

At an early stage of the descent process, the output rod 20 (the output rod main body 24 and the power transmission member 25) descends while rotating along the rotation grooves 36. Thereafter, the output rod 20 descends straight along the linear grooves 37. When an under surface of the clamp arm 22 fixed to the upper end portion of the output rod main body 24 comes into contact with a top surface of an object to be clamped such as a workpiece W, the clamp arm 22 presses (locks) the object onto the table T.

When the object is pressed from above, a reaction force from the object acts on the output rod main body 24 to incline the output rod main body 24. However, the power transmission member 25 structuring the output rod 20 is provided as a separate member not unitary with the output rod main body 24, and the power transmission member 25 is disposed radially outward from the output rod main body 24 with the clearance between them. Therefore, the power transmission member 25 is less likely to be affected by the reaction force from the object, unlike the output rod main body 24. Thus, it is possible to prevent deterioration in quality of engagement between the power transmission member 25 and the decelerator 6 (deterioration in quality of mesh between the feed screw portions 8b and 25a). Furthermore, in this embodiment, when the output rod main body 24 is inclined relative to the axis by the reaction force from the object, the transmission surface 31a of the output rod main body 24 is swayed on the spherical push surface 32a of the power transmission member 25. Due to this, the surface contact between the transmission surface 31a and the push surface 32a is maintained both before and after the swaying motion of the output rod main body 24. Consequently, a force pushing the power transmission member 25 downward is reliably transmitted to the output rod main body 24 via the push surface 32a and the transmission surface 31a.

To change the state of the electric clamping device from the lock state of FIG. 2 to the release state of FIG. 1, the motor 5 is rotated for releasing. Then, the motor 5 rotates the decelerator 6, so that the rotating worm wheel 8 raises the output rod main body 24 via the power transmission member 25.

The ascent process of the output rod main body 24 is described in detail. The rotational motion of the worm wheel 8 is converted to a linear motion at the feed screw portions 8b and 25a and thereby the power transmission member 25 ascends. The inclined surface 25c at the upper end of the ascending power transmission member 25 pushes the output rod main body 24 via the retaining ring 33, and thereby the output rod main body 24 ascends.

At an early stage of the ascent process, the output rod 20 (the output rod main body 24 and the power transmission member 25) ascends straight along the linear grooves 37. Thereafter, the output rod 20 ascends while rotating along the rotation grooves 36.

The above-described embodiment is changeable as follows.

Figure 6:
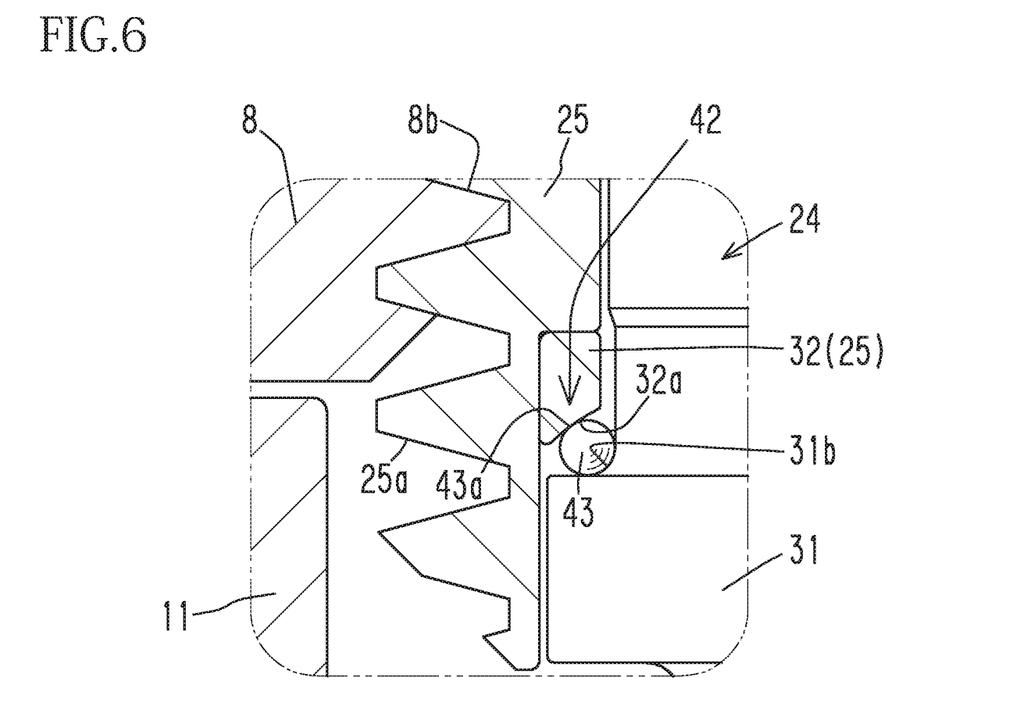
FIG. 6 is a diagram illustrating a modification of a lock-side driving mechanism and is similar to FIG. 4.

FIG. 6 is a diagram similar to FIG. 4 and illustrating a modification of the lock-side driving mechanism. A lock-side driving mechanism 42 shown in FIG. 6 is structured as follows. A recessed portion 31b is provided on an upper (release-side) surface of the flange portion 31 of the output rod main body 24, and a plurality of transmission balls 43 are fitted in the recessed portion 31*b*. The transmission balls 43 form a transmission surface 43*a* sloping toward the lock side relative to the axial direction.

Because the radius of curvature of the spherical push surface 32*a* of the power transmission member 25 (ring member 32) is larger than the radius of curvature of the transmission surface 43*a* formed by the transmission balls 43 (surfaces of the transmission balls 43), these surfaces 32*a* and 43*a* do not make surface contact. The both surfaces are, however, smooth spherical surfaces, and this stabilizes the swaying motion of the output rod main body 24 at the time of locking an object.

The transmission balls 43 may be disposed around the output rod main body 24 on the entire circumference thereof without a gap between the balls 43. Alternatively, for example, two or more transmission balls 43 may be disposed around the output rod main body 24 with gaps between the balls 43.

The transmission surface 31*a* shown in FIG. 4, which slopes toward the lock side relative to the axial direction, is shaped as a spherical surface. Instead of the spherical surface, the transmission surface 31*a* may be a tapered surface whose section is a straight line. Alternatively, the transmission surface 31*a* may be formed by a plurality of inclined surfaces provided around the output rod main body 24 at predetermined intervals. Still alternatively, the transmission surface may be a single inclined surface provided around the output rod main body 24. In the case where the transmission surface is formed by one or two inclined surfaces, it is preferable to provide the inclined surface(s) at a position corresponding to a direction in which the output rod main body 24 is swayed when viewing the output rod 20 along the axial direction.

In the above-described embodiment, the power transmission member 25 includes the ring member 32 as a separate component. Instead of this, the power the ring member 32 may be unitarily included in the power transmission member 25. That is, a power transmission member may be formed from a single material by machine processing.

In the above-described embodiment, the push surface 32*a* of the power transmission member 25 is in contact with the transmission surface 31*a* of the flange portion 31 of the output rod main body 24 in the release state of FIG. 1. Instead of this, there may be a gap in the axial direction between the push surface 32*a* of the power transmission member 25 and the transmission surface 31*a* of the flange portion 31 of the output rod main body 24 in the release state of FIG. 1.

The electric clamping device does not have to be of the type of device in which the output rod 20 rotates, but may be of the type of device in which the output rod 20 moves only straight in the up-down direction.

The motor 5 may be another type of motor instead of a stepping motor. The decelerator 6 is not limited to the worm decelerator, but may be structured by bevel gears.

Embodiments of the present invention have been hereinabove described. It is a matter of course that other changes or alterations can be made on the present invention within the scope of envisagement of one skilled in the art.

REFERENCE SIGNS LIST

1: housing; 5: motor; 6: decelerator; 20: output rod; 24: output rod main body; 25: power transmission member; 26: rotation preventing mechanism; 27, 42: lock-side driving mechanism; 28: release-side driving mechanism; 29: output rod guide mechanism; 31: flange portion; 31*a*, 43*a*: transmission surface; 31*b*: recessed portion; 32*a*: push surface; 34: annular wall; 35: guide groove; 36: rotation groove; 37: linear groove; 38: engagement ball; 40, 41: guide cylinder; 43: transmission ball.

The invention claimed is:

1. An electric clamping device comprising:
an output rod inserted in a housing so as to be movable in an axial direction toward a lock side and a release side;
a motor attached to the housing; and
a decelerator provided beside the output rod, the decelerator configured to transmit rotational motion of the motor to the output rod, wherein
the output rod comprises:
a tubular power transmission member screw-connected to the decelerator;
an output rod main body disposed radially inward of an inner peripheral surface of a cylindrical hole of the power transmission member with a clearance between the output rod main body and the inner peripheral surface;
a rotation preventing mechanism configured to prevent relative rotation between the output rod main body and the power transmission member;
a lock-side driving mechanism configured to move the output rod main body toward the lock side via the power transmission member;
a release-side driving mechanism configured to move the output rod main body toward the release side via the power transmission member; and
an output rod guide mechanism configured to guide movement of the output rod main body while preventing co-rotation with the decelerator.

2. The electric clamping device according to claim 1, wherein the lock-side driving mechanism comprises:
a transmission surface provided at a release-side portion of a flange portion provided on an outer periphery of the output rod main body, the transmission surface sloping toward the lock side relative to the axial direction; and
a push surface provided on a lock-side inner surface of the power transmission member, and
wherein when the motor moves the power transmission member to the lock side via the decelerator, the push surface pushes the transmission surface thereby to move the output rod main body toward the lock side.

3. The electric clamping device according to claim 2, wherein
the transmission surface is shaped as a spherical surface.

4. The electric clamping device according to claim 3, wherein
the push surface is shaped as a spherical surface configured to make surface contact with the transmission surface.

5. The electric clamping device according to claim 2, wherein
the transmission surface is structured by a plurality of transmission balls fitted in a recessed portion provided on a release-side surface of the flange portion.

6. The electric clamping device according to claim 1, wherein
guide cylinders configured to guide movement of the output rod main body in the axial direction are respectively attached to a release-side end portion and a lock-side end portion of the housing.

7. The electric clamping device according to claim 1, wherein:
- an annular wall protrudes from a lock-side inner surface of the housing toward the release side;
- the output rod main body is inserted in the annular wall;
- the output rod guide mechanism comprises
- a plurality of guide grooves provided on an outer periphery of the output rod main body at predetermined intervals in its circumferential direction and
- engagement balls supported by the annular wall, the engagement balls respectively fitted in the guide grooves; and
- each of the guide grooves includes a rotation groove and a linear groove which are provided continuously from the lock side toward the release side.

8. The electric clamping device according to claim 1, wherein
the decelerator is a worm decelerator.

\* \* \* \* \*